12 # United States Patent Office 3,274,023
Patented Sept. 20, 1966

3,274,023
SCUFF RESISTANT LEATHER
Joseph A. Bassett, Topsfield, and Malcolm H. Battles, Andover, Mass., assignors to Swift & Company, Chicago, Ill., a corporation of Illinois
No Drawing. Filed July 25, 1960, Ser. No. 44,859
6 Claims. (Cl. 117—142)

This invention relates to the treatment of leather and more particularly to a method for treating leather with a plastic impregnant to improve the properties thereof and the improved leather products thereby produced.

Various types of leather intended for a variety of uses have, in the past, been coated with plastic materials to provide a protective coating on the leather. A specific instance of this type is the finish applied to patent leather which involves the use of synthetic resin solutions plus pigments to provide a decorative and protective coating.

Methods involving coating or impregnation of leather usually involve deposition of the plastic from a solution of the plastic in an organic solvent on the leather. One drawback of these prior art techniques emanates from the type of polymer which is applied to the leather. In many cases the polymer is too rigid and reduces the flexibility of the leather substantially. Other polymers are too viscous for use in impregnating leathers while still others because of their physical characteristics completely saturate the leather, providing neither a coating nor a partial impregnation. An important balance must be provided by a resinous impregnant between flexibility and protective qualities. This is particularly so in the treatment of lightweight grain leathers of the type to which this invention is particularly directed.

It is therefore an object of this invention to provide a method for treating leather to impart improved scuff resistant properties to said leather.

Another object of the invention is the provision of a method for producing grain leather having a substantially improved break and scuffing resistance but having substantially undiminished the desirable flexibility, physical properties, water vapor transmission characteristics, and desirable natural leather appearance of the untreated leather product.

A further object is the provision of a modified polyamide resin impregnant particularly adapted for use where resistance to abrasion or scuffing is required along with a high degree of flexibility.

Still another object of the invention is to provide a lightweight leather product having a scuff resistant surface and good flexibility as well as satisfactory moisture vapor transmission characteristics.

Additional objects if not specifically set forth herein will be readily apparent to those skilled in the art from the detailed description of the invention which follows.

Generally the invention comprises the preparation and use of unique plastic impregnants and also the method and products obtained by the treatment of the grain side of lightweight leather such as is employed in manufacturing shoe uppers with a modified polyamide polymer and impregnating the depth of said grain layer with said polymer. The polymer is applied from solution, the interfacial characteristics of the modified polyamide being such that it wets and penetrates the grain layer of the leather substantially. The physical method of application is such that the polymer does not wet or impregnate the underlying corium layer. The solvent passes through this corium layer but because of what is believed to be the polar nature of the resin or interfacial forces between the grain layer fibres and the resin only the grain layer is permeated, and the corium layer remains unimpregnated. Also, the individual fibres of the grain layer are wet by and substantially impregnated with the resin. This is very desirable since the treated leather must be resistant to scuffing but should not be too stiff as it would be if the corium layer were impregnated.

The impregnating compositions of this invention are very unique since they tend to concentrate in the grain layer. Many materials when applied to the surface of leather, even though of high viscosity will permeate quite uniformly through the cross section of the leather. This tendency to penetrate through a major portion of the thickness of the leather precludes their use in imparting improved scuff resistance while retaining desirable flexibility in the leather product. Unmodified polyamides for example, while quite viscous at room temperature migrate through the grain layer and into the corium layer. These same materials when blocked have a lower initial viscosity but tend to concentrate in the grain layer in the desired manner.

The leather product with the grain impregnated with the modified polyamide retains substantially undiminished the desirable qualities in the untreated leather of flexibility, good moisture vapor transmission characteristics and attractive appearance while scuff or abrasion resistance is profoundly improved and "break" of the leather is materially enhanced. While the invention is particularly directed to lightweight grain leather used for shoe uppers, it is applicable generally to those grain or split leathers which are intended for use in areas where attractive appearance coupled with resistance to scuff or abrasion are desirable. This includes leather used for luggage, upholstery, gloves, shoes, etc., but excludes those areas of use where leather is used solely for strength or other physical characteristics as distinguished from decorative effects. Belting for machinery, etc., does not require attractive appearance and generally involves the use of heavy weight leather.

The composition employed in impregnating the grain side of the leather comprises a solution of a modified polyamide resin. The modified resin comprises the reaction product of a short chain monoepoxide with a polyamide of the type derived from polymeric fat acids and aliphatic polyamines. Polyamides of this type may be prepared in accordance with Cowan et al. Patent No. 2,450,940. Preparation of the polyamide involves the reaction between aliphatic polyamines such as diethylene triamine, triethylene tetramine, tetraethylene pentamine, 3,3'-imino bispropylamine and related polyalkylene polyamines with polymeric fat acids resulting from the polymerization of drying or semi-drying oils or from the free polyene fatty acids of 10–22 carbons or simple alcohol esters thereof. Polymeric fat acids suitable in the preparation of the polyamide include the polymerized mixture of acids derived from such naturally occurring materials as peanut oil, cottonseed oil, soybean oil, corn oil, linseed oil, tung oil, tall oil, etc.

Because there are a large number of polyamides of polymeric fat acids possible, it is desirable to also define the polyamide by physical constants. The polyamides which can be modified to obtain the unexpected benefits of this invention are liquids or soft, tacky resins that are semisolids at room temperature having a melting point of around 25–95° C. and an amine number of around 80–320. Also, these resins exhibit a penetration as measured by A.S.T.M. method D–5–52 at 25° C. of 90 or above. Preferred polyamides are those having a melting point of 30–55° C. and an amine number of about 80–100. The amine number of these materials is defined as the number of milligrams of potassium hydroxide equivalent to the amine groups present in one gram of the resin. The amine number gives a measure of the amount of free amine groups present in the polyamides.

Modification of the polyamide resin is effected by treatment of the resin with an oxirane containing aliphatic hydrocarbon, fatty acid, alcohol, ester, ether or other mono oxirane containing aliphatic derivatives having 4–18 carbons and being free of interfering substituents. Aliphatic hydrocarbon epoxides having 6–8 carbons such as octylene oxide and aliphatic oxirane containing ethers such as butyl glycidyl ether and amyl glycidyl ether are particularly desirable in blocking the amine groups in the polyamide to render the polymer flexible. Also lower epoxy alcohols, epoxy acids and esters of these materials with nonepoxy alcohols and acids, the total chain length of the molecule not exceeding about 8 carbons are suitable in modifying the polyamide. Lower aliphatic oxirane containing alkyl alcohols such as 3,4-epoxy hexanol, 2,3-dimethyl-4,5-epoxy octanol, 2,3-methoxy-4,5-epoxy octanol, 3,4-epoxy cyclohexanol, 2,3-epoxy cyclohexanol and similar lower epoxy fatty acids and esters of these materials with alcohols free of epoxy groups and acids free of epoxy groups, the total chain length of the molecule being around 6–8 carbons are specific compositions suitable in modifying the polyamide.

The amount of monoepoxide which is reacted with the polyamide depends upon the amount of blocking of the amine groups in the polyamide that is desired. In the present instance, very desirable impregnants for shoe uppers are obtained with modified polyamide resins having 20–60% of the amine groups blocked. Generally the polyamide should be blocked about 20–60% with the monoepoxide and preferably around 30–50%. The amount of blocking is calculated from the following equation:

$$\frac{\text{grams polyamide resin} \times F \times \frac{\text{molecular weight monoepoxide} \times \text{percent blocking desired}}{\text{acid equivalent weight of polyamide obtained by titration}}}{} = \text{grams monoxide}$$

F is a factor calculated from the number of primary and secondary amino groups present in the polyamide.

$$F = \frac{2(\text{primary amino groups}) + (\text{secondary amino groups})}{(\text{primary amino groups}) + (\text{secondary amino groups})}$$

The number of primary amino groups can be determined by reacting the polyamide with benzaldehyde and measuring the amount of water formed in the reaction. Primary plus secondary amino groups can be determined by acid titration and secondary amino groups by difference.

Blocking of the polyamide is achieved by heating the monoepoxide and polyamide to a temperature of around 120° C. to 200° C. for 1 to 4 hours, or until most of the monoepoxide is utilized. The reaction temperature is not critical and the usual time-temperature relationship is applicable. At lower temperatures the reaction must be carried out for longer periods of time than is the case when higher temperatures are employed. Generally it is convenient to conduct the reaction at the temperature at which the monoepoxide refluxes or where low boiling solvents are employed, at the reflux temperature of the solvent. It is preferred that the reaction be conducted at a temperature in excess of about 90° C. to insure completion of the reaction in a reasonable period of time. Extremely high temperatures bordering on pyrolysis of the reactants are, of course to be avoided. The reaction is desirably carried out in a solvent medium and agitation is employed. An example of the preparation of the blocked polyamide follows:

*Example I*

A polyamide having an amine number=88, a melting point=48° C. and a viscosity=12 poises at 150° C. is dissolved in toluene. 2472 grams of polyamide is dissolved in 4085 grams of toluene. The solution of the resin is stirred vigorously in a reaction vessel equipped with a dropping funnel, a thermometer and condenser. The temperature of the solution is elevated to 120° C. and 108 grams octylene oxide is added in a rapid stream from the dropping funnel. The temperature is maintained for a period of four hours. After cooling, the modified polyamide is recovered. The product is quite different from the unblocked polyamide in that it is less polar and the viscosity is decreased. The product is also less labile in the sense that it has a decreased tendency to migrate or "wick" into the corium layer. While the unblocked polyamides which are liquid at room temperature "wick" all the way through the leather and the polyamides which are semisolid at room temperature when heated slightly also penetrate through the leather the blocked compositions do not.

In the impregnation of conventional side leather after buffing with the modified polyamide resin, the modified resin in solution in toluene, perchlorethylene, butanol, or other solvents for the blocked resin is applied to the grain surface of the leather by roller coating, flow coating or other means known in the art. The solvent employed is used as a carrier for the modified resin and the solids content of the solution can range from about 10% solids to about 80% solids. The solids content of the solution is determined for the most part by handling requirements and ease of application. The solution should have a reasonably low viscosity to allow for uniform distribution of the resin on the leather. A solution containing about 30% solids has been found very satisfactory to obtain distribution and impregnation of the leather at a rate of about 8 grams of resin solids per square foot of leather. The modified resin possesses the unique ability to wet individual grain layer fibres but does not pass into the corium layer.

The following examples show the treatment of different types of grain leather impregnated with different modified polyamide resins. In each case, the improvement in scuff resistance in the modified resin compared to the unmodified resin is noted.

*Example II*

A polyamide of fatty acids and lower alkylamine having an amine value of 84 is dissolved by heating 5040 grams of the polyamide in 3360 grams of perchlorethylene at 134° C. The resin solution is stirred vigorously in a reaction vessel equipped with a dropping funnel, a thermometer and condenser. A rapid stream of 424 grams of butyl glycidyl ether is added to the resin solution and the temperature of the solution is maintained at 134° C. for a period of four hours. The product is diluted with 4260 grams perchlorethylene and 2516 grams n-butanol to form a workable solution for application to leather.

The solution is distributed by means of a flow coater on the surface of unfinished side leather to deposit about 34 grams/square foot of solution to the leather. The coated leather piece is then subjected to treatment with circulating warm air to evaporate the solvent. The coated leather is then finished in the usual fashion. The resulting product is very flexible, has finer wrinkles when folded than untreated leather, has a satisfactory water vapor transmission rate as well as improved resistance to scuff damage. The resistance to scuff damage is far superior to that exhibited by untreated leather or leather which has been treated with the polyamide without modification.

*Example III*

A polyamide having an amine value of 84 is modified with a higher colecular weight monoepoxide by melting 2750 grams of the polyamide and heating melted polyamide to 200° C. The liquid polyamide is stirred and 530 grams of mixed 1,2-epoxyhexadecane and 1,2-epoxyoctadecane is added to the liquid polyamide. The mixture is maintained at 200° C. for 2 hours to form the modified polyamide. After cooling to 130° C. the resin is diluted with 4960 grams perchlorethylene and 1660 grams n-butanol.

About 30 grams of solution per square foot of leather is applied to the surface of unfinished side leather by means of a roller coater. The solvent is removed by hanging the leather in a warm air drier. The treated leather after removal of solvent therefrom is finished in a conventional manner. The coated product shows improved break and scuff resistance as compared with untreated leather and also is superior to leather impregnated with an unmodified polyamide.

Treatment of grain leather in accordance with this invention provides a surface which is very compatible with and not adversely affected by finishing materials. The shoe uppers impregnated with the modified polyamide exhibit a substantial resistance to scuffing and wearing caused by glancing blows on shoes particularly around the toe and heel areas of the uppers. Also, there is an improved "break" in the leather and moisture vapor transmission characteristics are well above the minimum required for comfort. In addition, physical integrity of the leather is preserved even after exposure to severe abrasion or scuffing conditions.

Obviously, many modifications and variations of the invention as herein before set forth may be made without departing from the spirit and scope thereof, and therefore only such limitations should be imposed as are indicated in the appended claims.

We claim:

1. A method of treating grain leather to impart to the grain surface thereof scuff resistant properties while maintaining desirable flexibility and water vapor transmission characteristics of said leather as well as good break in said leather, comprising: applying to the grain side of said leather a modified unplasticized polyamide resin, which impregnates the grain layer of said leather substantially with said resin, the amount of said polyamide resin being sufficient to penetrate said grain layer, said modified polyamide resin being the reaction product of a polyamide of polymeric fat acids and an alkylene polyamine and an aliphatic monoepoxide having 4–18 carbons.

2. The method of claim 1 wherein the modified polyamide resin is prepared from the polyamide of polymeric fat acids and alkylene polyamine, the amine groups of said polyamide being blocked 30–50% with said monoepoxide.

3. The method of claim 1 wherein the resin is deposited in the grain surface of said leather from a solution of said resin in an organic solvent.

4. A method of treating grain leather to impart to the grain surface thereof, scuff resistant properties while maintaining desirable flexibility and water vapor transmission characteristics of said leather as well as good break in said leather comprising applying to the grain side of said leather a modified polyamide resin, which impregnates the grain layer of said leather substantially with said resin, the amount of said modified polyamide applied to the grain side being sufficient to provide in said leather about 4 to 30 grams of polyamide per square foot of said leather depending upon type of leather and result desired, said modified polyamide resin being the reaction product of a polyamide of polymeric fat acids and an alkylene polyamine, having an amine number of about 80–320 and an aliphatic monoepoxide having 4–18 carbons.

5. A leather product having substantially improved scuff resistance and improved "break" over the untreated leather which comprises grain leather impregnated substantially in the grain layer only with a modified polyamide resin, said modified polyamide resin being a reaction product of a polyamide of polymeric fat acids and alkylene polyamine having an amine number of about 80–320 and an aliphatic monoepoxide having 4–18 carbons.

6. A leather product having substantially improved scuff resistance and improved "break" over the untreated leather which comprises split leather impregnated substantially in the surface layer only with a modified polyamide resin, said modified polyamide resin being a reaction product of a polyamide of polymeric fat acids and alkylene polyamine having an amine number of about 80–320 and an aliphatic monoepoxide having 4–18 carbons.

References Cited by the Examiner

UNITED STATES PATENTS

| | | | |
|---|---|---|---|
| 2,302,332 | 11/1942 | Leekley | 117—161 X |
| 2,705,223 | 3/1955 | Renfrew et al. | 260—18 |
| 2,763,577 | 9/1956 | Lawler | 117—142 X |
| 2,819,278 | 1/1958 | De Groote et al. | 260—104.5 |
| 2,872,428 | 2/1959 | Schroeder | 117—142 X |
| 2,880,116 | 3/1959 | Alps et al. | 117—161 X |
| 2,881,194 | 4/1959 | Peerman et al. | 260—404.5 |
| 2,899,397 | 8/1959 | Aelony et al. | 260—18 |
| 2,939,853 | 6/1960 | Delius | 260—404.5 X |
| 2,943,953 | 7/1960 | Daniel | 117—161 |
| 2,957,783 | 10/1960 | Dachs et al. | 117—142 X |
| 2,970,971 | 2/1961 | Katz et al. | 260—78 X |
| 2,977,332 | 3/1961 | Zumstein | 117—161 |
| 2,981,701 | 4/1961 | St. Clair et al. | 117—161 |
| 3,035,000 | 5/1962 | Fulmer | 260—401.5 X |

WILLIAM D. MARTIN, *Primary Examiner.*

JOSEPH B. SPENCER, RICHARD D. NEVIUS, JOSEPH REBOLD, *Examiners.*

D. TOWNSEND, T. G. DAVIS, *Assistant Examiners.*